US012572561B2

(12) United States Patent
Yang et al.

(10) Patent No.: US 12,572,561 B2
(45) Date of Patent: Mar. 10, 2026

(54) METHOD AND APPARATUS FOR SYNCHRONOUSLY UPDATING METADATA IN DISTRIBUTED DATABASE

(71) Applicant: Beijing OceanBase Technology Co., Ltd., Beijing (CN)

(72) Inventors: Zhenkun Yang, Beijing (CN); Fusheng Han, Beijing (CN); Junquan Chen, Beijing (CN)

(73) Assignee: Beijing OceanBase Technology Co., Ltd., Beijing (CN)

( * ) Notice: Subject to any disclaimer, the term of this patent is extended or adjusted under 35 U.S.C. 154(b) by 0 days.

(21) Appl. No.: 18/769,788

(22) Filed: Jul. 11, 2024

(65) Prior Publication Data

US 2024/0370459 A1     Nov. 7, 2024

Related U.S. Application Data

(63) Continuation of application No. PCT/CN2023/070479, filed on Jan. 4, 2023.

(30) Foreign Application Priority Data

Jan. 12, 2022     (CN) .......................... 202210032984.6

(51) Int. Cl.
*G06F 7/00*          (2006.01)
*G06F 16/23*        (2019.01)
(Continued)

(52) U.S. Cl.
CPC ........ *G06F 16/275* (2019.01); *G06F 16/2365* (2019.01)

(58) Field of Classification Search
None
See application file for complete search history.

(56) References Cited

U.S. PATENT DOCUMENTS 10,803,012 B1 * 10/2020 Madhavarapu ....... G06F 16/113
2004/0068516 A1    4/2004 Lee et al.
(Continued)

FOREIGN PATENT DOCUMENTS

CN        103294675 A      9/2013
CN        102693324 B      3/2015
(Continued)

OTHER PUBLICATIONS

Chinese Search Report issued in corresponding Chinese Application No. 202210032984.6 (1 page), Feb. 22, 2022.
(Continued)

*Primary Examiner* — Tuan A Pham
(74) *Attorney, Agent, or Firm* — Finnegan, Henderson, Farabow, Garrett & Dunner, LLP

(57)          ABSTRACT

Embodiments of this specification provide a method and an apparatus for synchronously updating metadata in a distributed database. The distributed database includes a plurality of database nodes. A first node stores a first primary replica of a target replicated table, and a plurality of remaining second nodes store first backup replicas of the target replicated table. A full synchronization protocol is used between the first primary replica and the first backup replicas. The method is applied to the first node and includes: receiving an update request related to first metadata of a first data table in the distributed database; and writing update information related to the first metadata into the first primary replica based on the update request, to synchronize the update information to the respective first backup replicas of the plurality of second nodes based on the full synchronization protocol.

18 Claims, 9 Drawing Sheets

(51) Int. Cl.
  *G06F 16/27*        (2019.01)
  *G06F 17/00*        (2019.01)

(56)                  References Cited

U.S. PATENT DOCUMENTS

| | | | |
|---|---|---|---|
| 2014/0379644 | A1 | 12/2014 | Yamada |
| 2018/0060373 | A1* | 3/2018 | Foebel .................. G06F 16/275 |
| 2023/0018975 | A1* | 1/2023 | Sreenivasan ........ G06F 16/2379 |

FOREIGN PATENT DOCUMENTS

| | | |
|---|---|---|
| CN | 109101200 A | 12/2018 |
| CN | 109299056 B | 10/2019 |
| CN | 113420081 A | 9/2021 |
| CN | 114048269 A | 2/2022 |
| CN | 113239013 B | 4/2024 |

OTHER PUBLICATIONS

PCT International Search Report and Written Opinion mailed Mar. 21, 2023, issued in corresponding International Application No. PCT/CN2023/070479(10 pgs.).

* cited by examiner

800

METHOD AND APPARATUS FOR SYNCHRONOUSLY UPDATING METADATA IN DISTRIBUTED DATABASE

CROSS-REFERENCE TO RELATED APPLICATIONS

This application is a continuation application of International Application No. PCT/CN2023/070479, filed Jan. 4, 2023, which claims priority to Chinese Patent Application No. 202210032984.6, filed on Jan. 12, 2022, the content of both of which is incorporated herein by reference in its entirety.

TECHNICAL FIELD

Embodiments of this specification relate to the field of computer technologies, and specifically, to a method and an apparatus for synchronously updating metadata in a distributed database.

BACKGROUND

Currently, in a large-scale distributed database, synchronously updating metadata (Schema) may be difficult, because it cannot be ensured that update data of the metadata is simultaneously pushed to database nodes in the distributed database. Consequently a problem that different database nodes read different metadata in a metadata update process may be caused. For example, after a user modifies metadata of a data table, it is possible that some database nodes read updated metadata of the data table, while the other database nodes read the metadata of the data table before the update.

Therefore, a proper and reliable solution is urgently needed to synchronously update metadata.

SUMMARY

Embodiments of this specification provide a method for synchronously updating metadata in a distributed database, to synchronously update metadata, so that after a user modifies the metadata, each database node can read updated metadata.

A first aspect of this specification provides a method for synchronously updating metadata in a distributed database. The distributed database includes a plurality of database nodes. A first node stores a first primary replica of a target replicated table, and a plurality of remaining second nodes store first backup replicas of the target replicated table. A full synchronization protocol is used between the first primary replica and the first backup replicas. The method is applied to the first node and includes: receiving an update request related to first metadata of a first data table in the distributed database; and writing update information related to the first metadata into the first primary replica based on the update request, to synchronize the update information to the respective first backup replicas of the plurality of second nodes based on the full synchronization protocol, wherein when the first metadata is used by a second node of the plurality of second nodes, update data of the first metadata is obtained by the second node based on the update information.

In some embodiments, the update request includes the update data; and the writing update information related to the first metadata into the first primary replica includes: writing the update data into the first primary replica.

In some embodiments, the writing update information related to the first metadata into the first primary replica includes: determining a target update marker related to the first metadata; and writing the target update marker into the first primary replica.

In some embodiments, the determining a target update marker related to the first metadata includes: obtaining a target version number, where the target version number is a version number of the first metadata or metadata of the distributed database, and is generated in response to an update operation corresponding to the update data; and generating the target update marker based on the target version number.

In some embodiments, the generating the target update marker based on the target version number includes: using the target version number as the target update marker.

In some embodiments, the generating the target update marker based on the target version number includes: hashing or signing the target version number, and using an obtained hash value or signature as the target update marker.

In some embodiments, the determining a target update marker associated with the first metadata includes: obtaining target metadata that includes the update data, where the target metadata is at least partial content of the first metadata obtained after the update data is added, or is at least partial content of metadata obtained after the update data is added to the distributed database; and generating the target update marker based on the target metadata.

In some embodiments, the generating the target update marker based on the target metadata includes: hashing or signing the target metadata, and using an obtained hash value or signature as the target update marker.

In some embodiments, the update request includes the update data; and the method further includes: correspondingly caching the update data and the target update marker into a local memory.

In some embodiments, the first node further stores a second primary replica of a metadata table, and the metadata table stores metadata of the distributed database; and the method further includes: updating the cached update data to the second primary replica.

In some embodiments, after the target update marker is synchronized to the respective first backup replicas of the plurality of second nodes, the method further includes: receiving an obtaining request for obtaining the update data, where the obtaining request is sent by any second node in the plurality of second nodes when it is detected that the target update marker associated with the first metadata is not cached in a memory of the second node; and returning the update data to the any second node.

A second aspect of this specification provides a method for synchronously updating metadata in a distributed database. The distributed database includes a plurality of database nodes. A first node stores a first primary replica of a target replicated table, and a plurality of remaining second nodes store first backup replicas of the target replicated table. A full synchronization protocol is used between the first primary replica and the first backup replicas. The method includes: receiving, by the first node, an update request related to first metadata of a first data table in the distributed database; writing, by the first node, update information related to the first metadata into the first primary replica based on the update request, to synchronize the update information to the respective first backup replicas of the plurality of second nodes based on the full synchronization protocol; and obtaining, by a second node in the plurality of second nodes when using the first metadata, update data of the first metadata based on the update information synchronized to a local first backup replica.

In some embodiments, the update request includes the update data; the writing update information related to the first metadata into the first primary replica includes: writing the update data into the first primary replica; and the obtaining update data of the first metadata includes: obtaining the update data from the local first backup replica.

In some embodiments, the writing update information related to the first metadata into the first primary replica includes: determining a target update marker related to the first metadata; and writing the target update marker into the first primary replica.

In some embodiments, the update request includes the update data; and the method further includes: correspondingly caching, by the first node, the update data and the target update marker into a local memory.

In some embodiments, the obtaining update data of the first metadata includes: reading the target update marker from the local first backup replica; detecting whether the target update marker associated with the first metadata is cached in a local memory; sending a request for obtaining the update data to the first node in response to that a detection result is no; and receiving the update data returned by the first node; and the method further includes: correspondingly caching, by the any second node, the update data and the target update marker into the local memory.

In some embodiments, a historical update marker associated with the first metadata is cached in the local memory of the any second node; and the detecting whether the target update marker associated with the first metadata is cached in a local memory includes: determining whether the target update marker is the same as the historical update marker; and if a determining result is yes, determining that the target update marker associated with the first metadata is cached in the local memory; or if a determining result is no, determining that the target update marker associated with the first metadata is not cached in the local memory.

In some embodiments, after the correspondingly caching, by the any second node, the update data and the target update marker into the local memory, the method further includes: reading the target update marker from the local first backup replica when using the first metadata again; detecting whether the target update marker associated with the first metadata is cached in the local memory; and obtaining the update data from the local memory in response to that a detection result is yes.

A third aspect of this specification provides an apparatus for synchronously updating metadata in a distributed database. The distributed database includes a plurality of database nodes. A first node stores a first primary replica of a target replicated table, and a plurality of remaining second nodes store first backup replicas of the target replicated table. A full synchronization protocol is used between the first primary replica and the first backup replicas. The apparatus is applied to the first node and includes: a processor; and a memory storing instructions executable by the processor. The processor is configured to receive an update request related to first metadata of a first data table in the distributed database; and write update information related to the first metadata into the first primary replica based on the update request, to synchronize the update information to the respective first backup replicas of the plurality of second nodes based on the full synchronization protocol, wherein when the first metadata is used by a second node of the plurality of second nodes, update data of the first metadata is obtained by the second node based on the update information.

BRIEF DESCRIPTION OF DRAWINGS

The following briefly describes the accompanying drawings, which illustrate example embodiments of this specification. A person of ordinary skill in the art can derive other embodiments from these accompanying drawings without creative efforts.

DESCRIPTION OF EMBODIMENTS

The following further describes example embodiments of this specification in detail with reference to the accompanying drawings. It can be understood that the specific embodiments described herein are merely intended to explain the related invention, but are not intended to limit the invention. The described embodiments are merely some examples but not all of the embodiments of this specification. All other embodiments obtained by a person of ordinary skill in the art based on the embodiments of this specification without creative efforts shall fall within the protection scope of this application.

It should be noted that for ease of description, only parts related to the related invention are shown in the accompanying drawings. When there is no conflict, the embodiments of this specification and features in the embodiments can be combined with each other.

As described above, currently, in a large-scale distributed database, after a user modifies metadata of a data table, it is possible that some database nodes read updated metadata of the data table, while the other database nodes read the metadata of the data table before the update.

Figure 1:
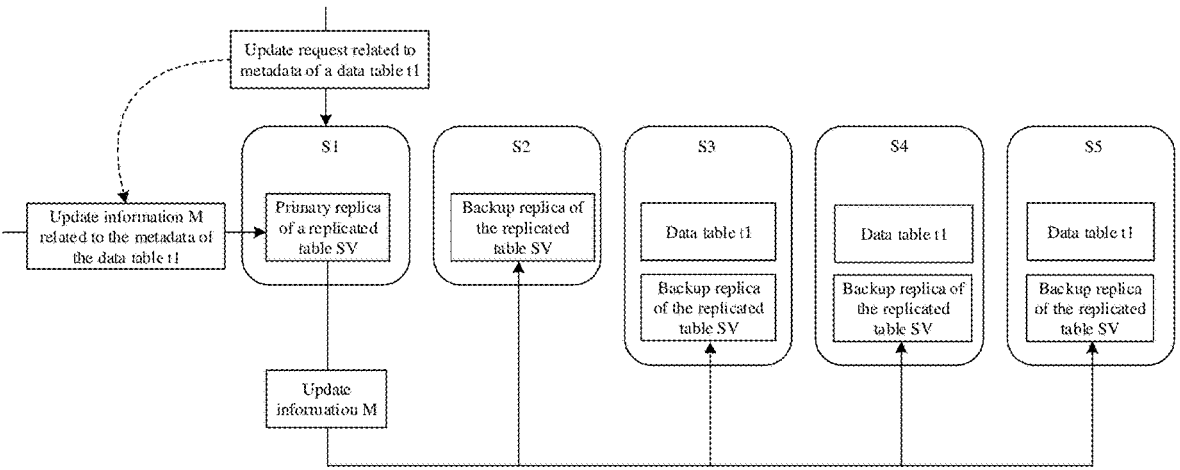
FIG. 1 is a schematic diagram of a system architecture of a distributed database according to an embodiment.

Based on this, embodiments of this specification provide a method for synchronously updating metadata in a distributed database, to synchronously update metadata, so that after a user modifies the metadata, each database node can read updated metadata. FIG. 1 is a schematic diagram of a system architecture of a distributed database according to an embodiment.

In embodiments of this specification, the distributed database includes a plurality of database nodes. For example, the system architecture shown in FIG. 1 includes the plurality of database nodes, S1, S2, S3, S4, and S5. It should be understood that the plurality of database nodes shown in FIG. 1 are merely example nodes, and there can be more nodes in actual application. This is not specifically limited herein.

The distributed database in the embodiments of this specification supports creation of a common data table, and further supports creation of a replicated table. The replicated table can be understood as a special data table, and has features such as real-time data synchronization.

For example, a data table can have a replicated table attribute, and the attribute can correspond to a first value used to represent a common table and a second value used to represent a replicated table. When a data table is created, an attribute value of a replicated table attribute of the data table can be set to the second value, to create a replicated table. For a created common data table, an attribute value of a replicated table attribute of the data table can be modified from the first value to the second value, to change the data table to a replicated table.

The replicated table is usually stored on all of the plurality of above-mentioned database nodes. For example, a primary replica of the replicated table is stored on a specific node in the plurality of database nodes, and backup replicas of the replicated table are stored on a plurality of remaining nodes other than the specific node in the plurality of database nodes. A full synchronization protocol can be used between the primary replica and the backup replica of the replicated table.

Based on the full synchronization protocol, data updated to the primary replica of the replicated table is synchronized in real time to the backup replica of the replicated table. In an example, specific update logic usually includes the following: Whenever an operation is performed on the primary replica of the replicated table, a redo log (redo log) related to the operation can be recorded, and then the redo log can be sent to the plurality of nodes, so that the plurality of nodes perform the same operation on the backup replicas of the replicated table based on the redo log. Therefore, it can be ensured that the primary replica and the backup replica of the replicated table store the same data.

Based on the feature of the replicated table that data of the replicated table can be synchronously updated to all database nodes in real time, a target replicated table, for example, a replicated table SV shown in FIG. 1, related to metadata update can be created in the distributed database in advance. The replicated table SV can store update information related to metadata of the distributed database. The update information can be specific update data, or can be an update marker or the like. This is not specifically limited herein.

A primary replica of the replicated table SV is stored on a specific node in the plurality of database nodes, for example, stored on the node S1 shown in FIG. 1. Backup replicas of the replicated table SV can be stored on a plurality of remaining nodes, for example, stored on the nodes S2, S3, S4, and S5 shown in FIG. 1. Further, the primary replica and the backup replica of the replicated table SV can be stored on disks of database nodes on which the primary replica and the backup replica are located.

In addition, a common data table is further created in the distributed database in advance, for example, includes but is not limited to a data table t1 shown in FIG. 1. The data table t1 can be, for example, a data table used to store user data, service data, or the like. This is not specifically limited herein.

The data table t1 is usually stored on some nodes in the plurality of database nodes, for example, can be stored on the nodes S3, S4, and S5 shown in FIG. 1. For example, a primary replica of the data table t1 can be stored on a specific node in the some nodes, and backup replicas of the data table t1 can be stored on the remaining nodes in the some nodes. Further, the primary replica and the backup replica of the data table t1 can be stored on disks of database nodes on which the primary replica and the backup replica are located.

It should be noted that because a storage manner of the common data table is not a focus of this solution, the primary replica and the backup replica are not distinguished for the data table t1 in FIG. 1.

In the distributed database described above, read and write operations on a table are usually performed on a primary replica of the table. Therefore, for the table, a database node on which the primary replica of the table is located can be considered as a master node of the table, and a processing request for the table can be routed to the master node for execution.

Based on this, the node S1 on which the primary replica of the replicated table SV is located can be considered as a master node of the replicated table SV, and the node S1 can receive a processing request for the replicated table SV.

The data table t1 is used as an example. In this case, when a user modifies metadata of the data table t1, the node S1 can receive an update request related to the metadata of the data table t1.

Then, the node S1 can write update information M related to the metadata of the data table t1 into the primary replica of the replicated table SV based on the received update request. The update information M can be update data of the metadata of the data table t1, or can be a target update marker related to the metadata of the data table t1 or the like. Then, based on the full synchronization protocol described above, the update information M can be automatically synchronized to the backup replicas of the replicated table SV that are respectively stored on the nodes S2, S3, S4, and S5.

Subsequently, when using the metadata of the data table t1, any node in the nodes S2, S3, S4, and S5 can obtain the update data of the metadata of the data table t1 based on the update information M synchronized to the backup replica of the replicated table SV. Therefore, metadata can be synchronously updated, and it can be ensured that after the user modifies the metadata, each database node can definitely read updated metadata.

Figure 2:
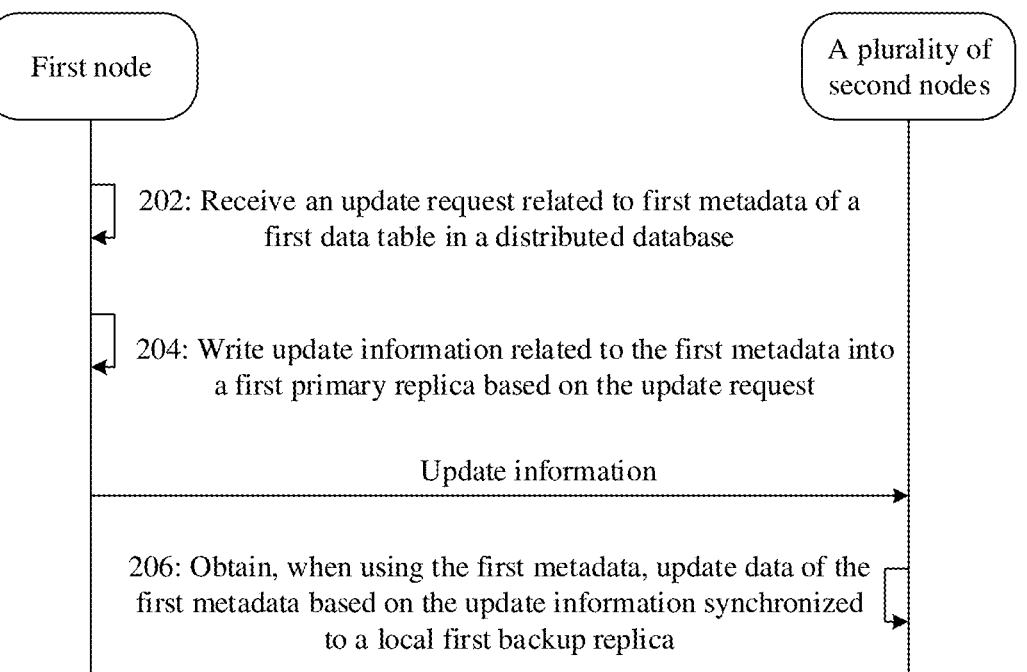
FIG. 2 is a schematic diagram of a method for synchronously updating metadata in a distributed database according to an embodiment.

FIG. 2 is a schematic diagram of a method for synchronously updating metadata in a distributed database according to an embodiment. The distributed database includes a plurality of database nodes. A specific node (referred to as a first node below) stores a primary replica (referred to as a first primary replica below) of a target replicated table, and a plurality of remaining nodes (referred to as a plurality of second nodes below) store backup replicas (referred to as first backup replicas below) of the target replicated table. A full synchronization protocol is used between the first primary replica and the first backup replicas. The method includes the following steps.

Step 202: The first node receives an update request related to first metadata of a first data table in the distributed database.

Step 204: The first node writes update information related to the first metadata into the first primary replica based on the update request, so that the update information is synchronized to the respective first backup replicas of the plurality of second nodes based on the full synchronization protocol.

Step 206: Any second node in the plurality of second nodes obtains, when using the first metadata, update data of the first metadata based on the update information synchronized to a local first backup replica.

In an embodiment, in step 202, the first node can receive in real time an update request related to metadata of any data table in the distributed database. Herein, for ease of description, the any data table is referred to as the first data table, and metadata of the first data table is referred to as the first metadata. The update request can be triggered by a user, and can include the update data of the first metadata.

In an embodiment, in step 204, the first node can write the update information related to the first metadata into the first primary replica based on the update request, so that the update information is synchronized to the respective first backup replicas of the plurality of second nodes based on the full synchronization protocol.

For example, the update request can include the update data of the first metadata, and in step 204, the first node can write the update data as the update information into the first primary replica. Based on this, the update data is synchronized to the respective first backup replicas of the plurality of second nodes based on the full synchronization protocol. It can be understood that based on this implementation, once the update data is written into the first primary replica, the update data is immediately synchronized to the respective first backup replicas of the plurality of second nodes. Therefore, in step 206, the any second node in the plurality of second nodes can directly obtain the update data of the first metadata from the locally stored first backup replica when using the first metadata.

Figure 3:
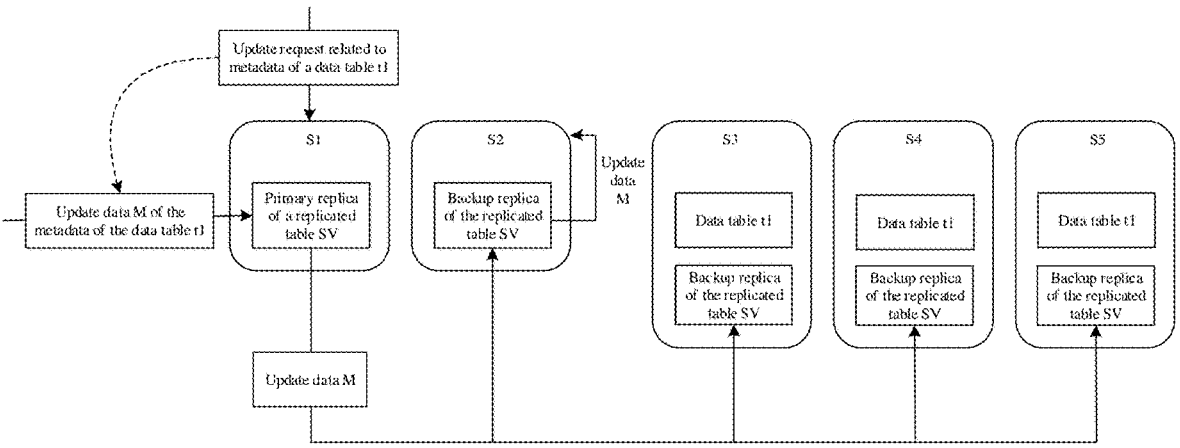
FIG. 3 is a schematic diagram of a process of synchronously updating metadata according to an embodiment.

In an implementation in which the update data is used as the update information, the update information M shown in FIG. 1 can be specifically update data M. The any second node in the plurality of second nodes, for example, the node S2 shown in FIG. 1, can obtain the update data M of the metadata from the locally stored backup replica of the replicated table SV when using the metadata of the data table t1, as shown in FIG. 3. FIG. 3 is a schematic diagram of a process of synchronously updating metadata according to an embodiment. The process is similar to the above description in connection with FIG. 1, except that the update data M is used as the update information.

In addition, when the update data is used as the update information, the target replicated table can pre-store metadata of the distributed database, for example, full metadata, and the first node can update the update data in the update request to the first primary replica. For example, when the update data is to-be-inserted data, the first node can directly write the update data into the first primary replica. When the update data is data used to replace some existing metadata in the first primary replica, the first node can use the update data to replace the some metadata in the first primary replica.

In some embodiments, when the target replicated table is used to store the metadata of the distributed database, because the target replicated table is stored on each database node in the distributed database, when a data amount of the metadata of the distributed database is relatively large, a relatively large amount of storage space is usually occupied, which brings specific storage pressure to the distributed database.

Figure 4:
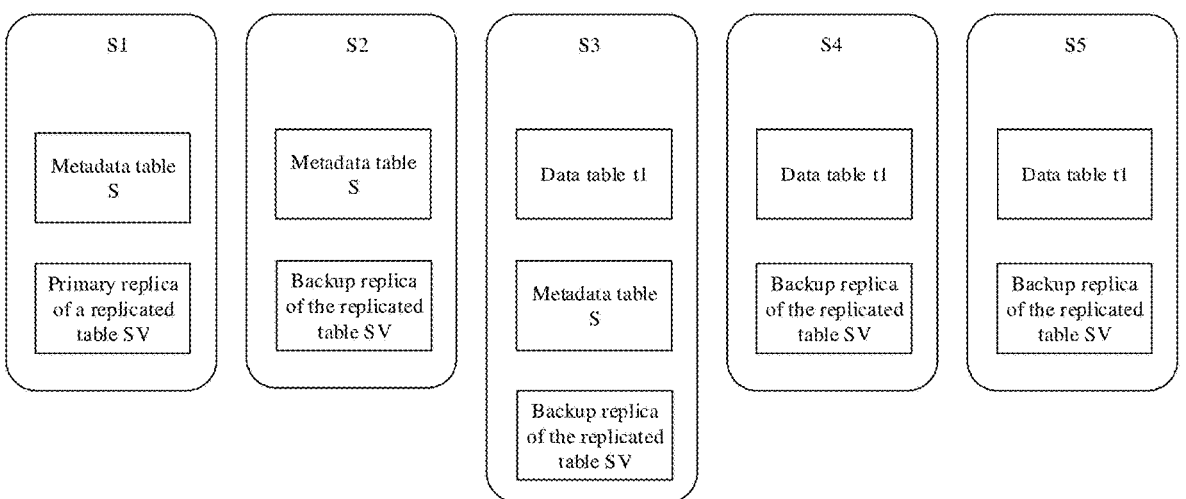
FIG. 4 is a schematic diagram of a storage manner of a metadata table according to an embodiment.

To reduce the storage pressure of the distributed database and save storage space, in another embodiment, the target replicated table can be used to store an update marker related to metadata, a metadata table used for storing the metadata of the distributed database can be further created in the distributed database, and the metadata table can be stored on some database nodes in the distributed database. Each node shown in FIG. 1 is used as an example. As shown in FIG. 4, a metadata table S is stored on the nodes S1, S2, and S3 in the distributed database.

It should be understood that a primary replica (referred to as a second primary replica below) of the metadata table can be stored on a specific node in the some database nodes, and backup replicas (referred to as second backup replicas below) of the metadata table can be stored on the remaining nodes in the some database nodes. Further, the primary replica and the backup replica of the metadata table can be stored on disks of database nodes on which the primary replica and the backup replica are located.

The first primary replica of the target replicated table and the second primary replica of the metadata table may be stored on the same database node, so that the first primary replica and the second primary replica can be conveniently and quickly updated.

Figure 5:
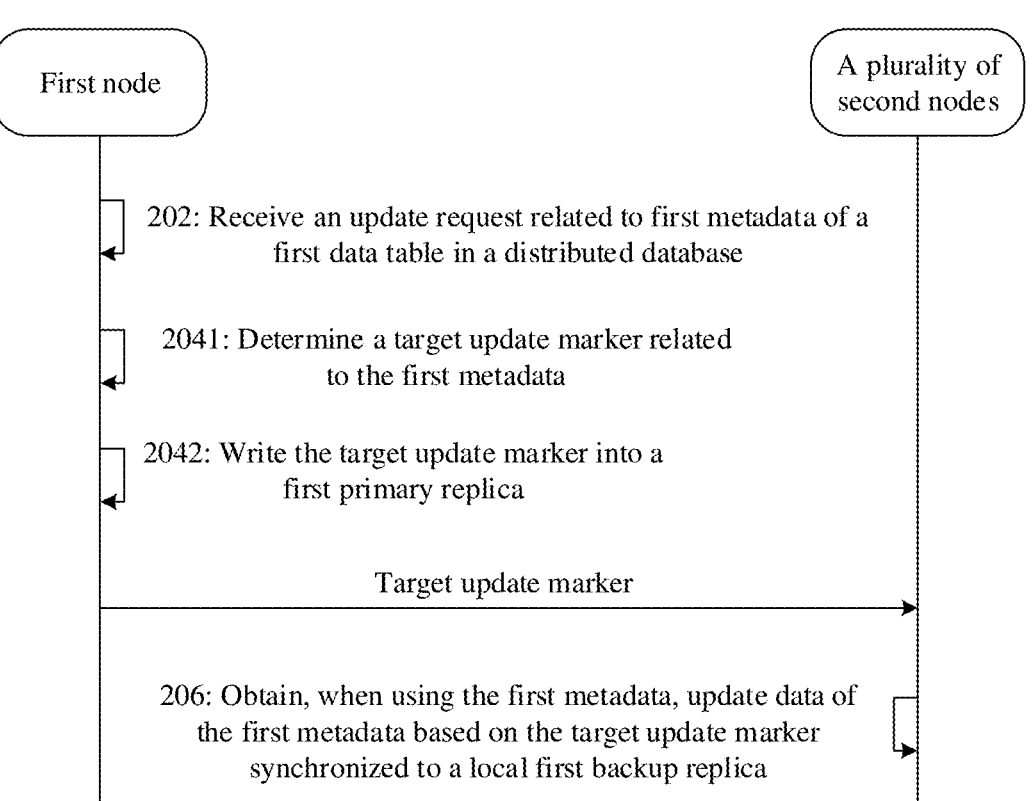
FIG. 5 is a schematic diagram of a method for synchronously updating metadata in a distributed database according to an embodiment.

For example, when the target replicated table is used to store an update marker related to metadata, step 204 can include sub-step 2041 and sub-step 2042 shown in FIG. 5. In sub-step 2041, the first node can determine a target update marker related to the first metadata. In sub-step 2042, the first node can write the target update marker into the first primary replica.

In sub-step 2041, the first node can determine, by using various determining methods, the target update marker related to the first metadata.

In an implementation, in sub-step 2041, the first node can obtain a target version number, where the target version number is a version number of the first metadata or metadata of the distributed database, and is generated in response to an update operation corresponding to the update data. Then, the first node can generate the target update marker based on the target version number.

The target version number may be a latest version number of the first metadata or the metadata of the distributed database. Update of metadata of any data table affects both a version number of the metadata of the data table and the version number of the metadata of the distributed database. The version number of the metadata of the distributed database can be referred to as a global version number. That is, the global version number is updated with update of metadata of any data table in the distributed database, and a version number of the metadata of the any data table is updated with the update of the metadata.

In practice, a version number generation algorithm related to the target version number can be deployed on the first node, and the first node can generate the target version number by using the version number generation algorithm.

After obtaining the target version number, the first node can directly use the target version number as the target update marker, or the first node can hash or sign the target version number, and use an obtained hash value or signature as the target update marker.

In another implementation, in sub-step 2041, the first node can obtain target metadata that includes the update data, where the target metadata is at least partial content of the first metadata obtained after the update data is added, or is at least partial content of metadata obtained after the update data is added to the distributed database. Then, the first node can generate the target update marker based on the target metadata.

For example, the update request can include the update data of the first metadata, and the first node can obtain at least partial content of the locally stored first metadata or the metadata of the distributed database, for example, obtain the at least partial content from a local memory and/or the stored second primary replica. Then, the first node can combine the update data with the obtained at least partial content, to obtain the target metadata. For example, after obtaining the target metadata, the first node can hash or sign the target metadata, and use an obtained hash value or signature as the target update marker.

After sub-step 2042 is performed, the target update marker is synchronized to the respective first backup replicas of the plurality of second nodes based on the full synchronization protocol. Then, as shown in FIG. 5, in step 206, the any second node in the plurality of second nodes can obtain, when using the first metadata, the update data of the first metadata based on the target update marker synchronized to the local first backup replica.

Figure 6:
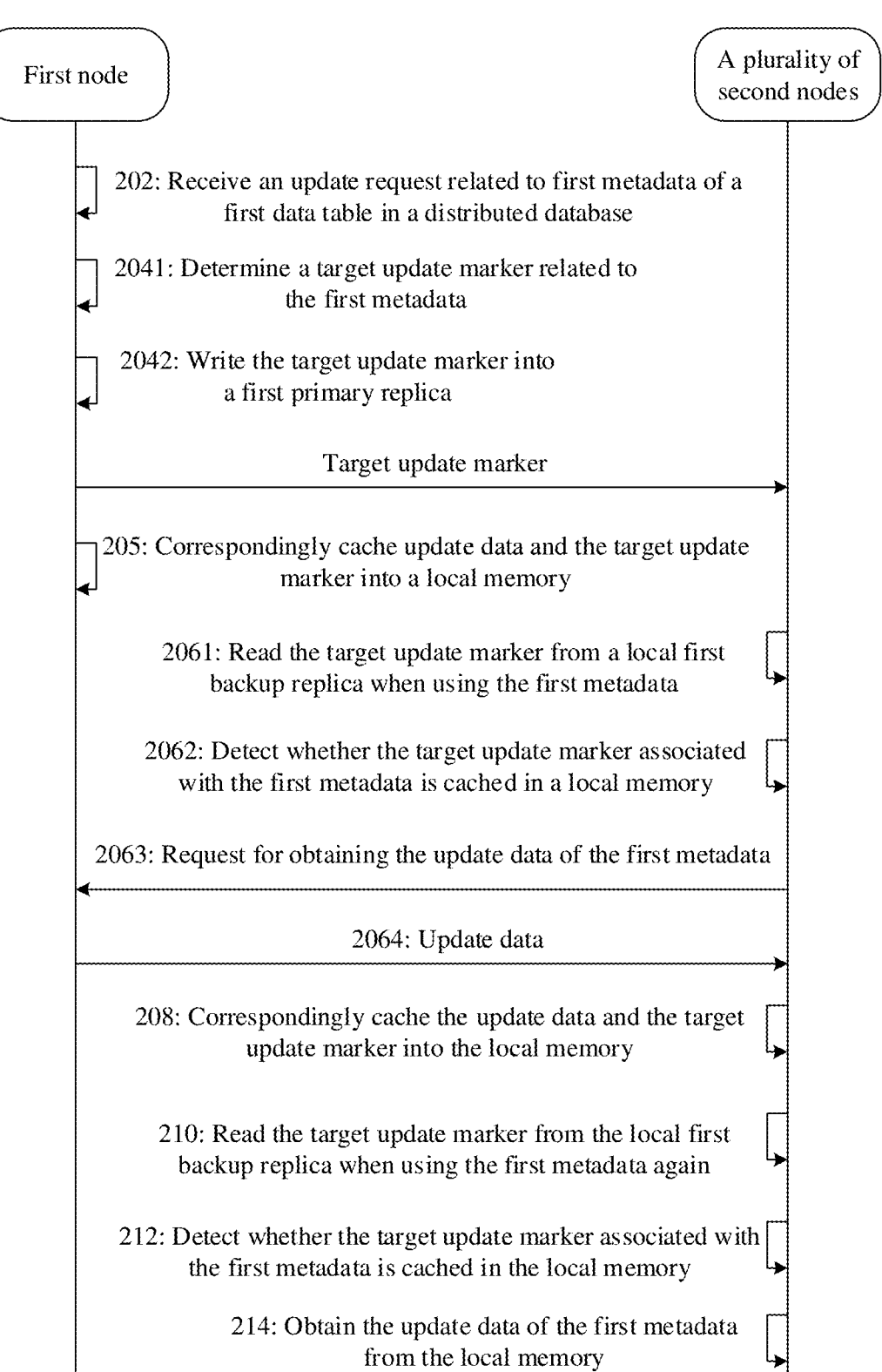
FIG. 6 is a schematic diagram of a method for synchronously updating metadata in a distributed database according to an embodiment.

In some embodiments, the update request can further include the update data of the first metadata. After step 2041, the first node can further correspondingly cache the update data and the target update marker into the local memory by performing step 205, as shown in FIG. 6. Further, when the first node stores the second primary replica, the first node can further update the cached update data to the second primary replica. For example, the update data can be updated to the second primary replica when a new update cycle arrives.

Based on this, subsequently, when the any second node needs to use the first metadata, if it is learned, based on the target update marker synchronized to the local first backup replica, that latest update data of the first metadata is not cached in a local memory, the update data can be obtained from the first node.

For example, step 206 can further include sub-steps 2061-2064 shown in FIG. 6. In sub-step 2061, the any second node in the plurality of second nodes can read the target update marker from the local first backup replica when using the first metadata.

Then, in sub-step 2062, the any second node can detect whether the target update marker associated with the first metadata is cached in the local memory. For example, the any second node can search the local memory for a historical update marker associated with the first metadata. If the historical update marker is not found, it can be determined that the target update marker associated with the first metadata is not cached in the local memory. When the historical update marker is found, it can be then determined whether the target update marker is the same as the historical update marker. If a determining result is yes, it can be determined that the target update marker associated with the first metadata is cached in the local memory, and then it can be learned that the latest update data of the first metadata is cached in the local memory. If a determining result is no, it can be determined that the target update marker associated with the first metadata is not cached in the local memory, and then it can be learned that the latest update data of the first metadata is not cached in the local memory.

Figure 7:
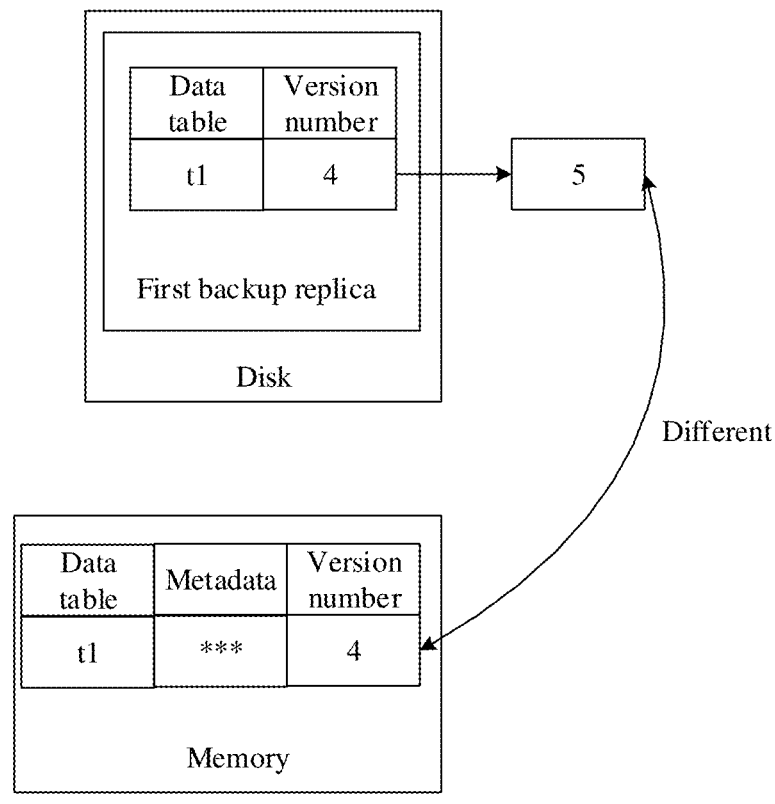
FIG. 7 is a schematic diagram of a method for detecting, by a second node, whether a latest version number of metadata of a data table is cached in a local memory, according to an embodiment.

For example, the first data table is the data table t1, and the target update marker is a latest version number of the metadata of the data table t1. FIG. 7 shows that a version number of the metadata of the data table t1 is changed from 4 to the latest version number 5 in a first backup replica stored on a disk of any second node. In addition, a historical version number 4 of the metadata of the data table t1 and historical update data "*" corresponding to the historical version number 4 are cached in a local memory of the any second node. The any second node can determine, by comparing the historical version number 4 with the latest version number 5, that the two version numbers are different, and then can learn that the historical update data "*" cached in the local memory is not the latest update data of the first metadata.

When a detection result in sub-step 2062 is no, the any second node can send an obtaining request for obtaining the update data of the first metadata to the first node by performing sub-step 2063. The obtaining request can include information such as a table identifier of the first data table. Then, after receiving the obtaining request, the first node can return the update data, for example, can return the cached update data to the any second node. Therefore, the any second node can receive, by performing sub-step 2064, the update data returned by the first node.

By performing sub-steps 2061-2064, it can be ensured that the any second node can obtain the latest update data of the first metadata when using the first metadata, and the situation can be avoided in which some second nodes read updated metadata of the first data table, and the other second nodes read metadata of the first data table before the update occurs.

In addition, after sub-step 2064, the any second node can correspondingly cache the received update data and the target update marker into the local memory by performing step 208. In this way, the any second node can obtain the update data from the local memory when using the first metadata again.

For example, referring to FIG. 6, after step 208, when the any second node uses the first metadata again, the second node can perform step 210 to read the target update marker from the local first backup replica, and then perform step 212 to detect whether the target update marker associated with the first metadata is cached in the local memory. Because before step 212, the any second node has correspondingly cached the update data and the target update marker into the local memory by performing step 208, a detection result in step 212 is definitely yes. Therefore, the any second node can obtain, in response to that the detection result is yes, the update data of the first metadata from the local memory by performing step 214.

According to the method for synchronously updating metadata in a distributed database described above, by effectively using the target replicated table, metadata can be synchronously updated, and it can be ensured that after the user modifies the metadata, each database node can definitely read updated metadata.

It should be noted that when the target version number is a latest global version number, after the latest global version number is synchronized to the respective first backup replicas of the plurality of second nodes, the latest global version number affects cache update performed by the plurality of second nodes on metadata of each data table in the distributed database. For example, even if metadata of some data tables is not changed, after the latest global version number is synchronized to the respective first backup replicas of the plurality of second nodes, any second node in the plurality of second nodes performs, when using the metadata of these data tables for the first time, cache update on the metadata of these data tables based on the latest global version number synchronized to a local first backup replica. In the implementation in which the latest global version number is used as the target version number, the second node may perform some redundant operations.

In addition, when the target version number is a latest version number of metadata of a single data table, after the latest version number is synchronized to the respective first backup replicas of the plurality of second nodes, the latest version number affects only cache update performed by the plurality of second nodes on the metadata of the single data table. Compared with the implementation in which the latest global version number is used as the target version number, this implementation can effectively avoid a case in which the second node performs redundant operations.

Figure 8:
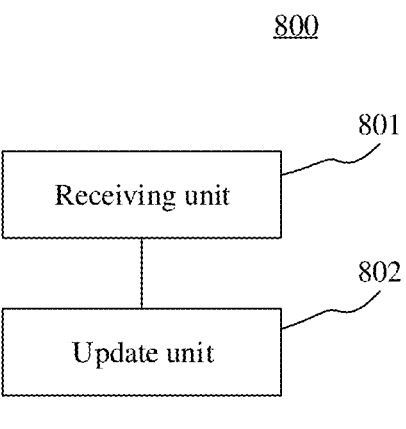
FIG. 8 is a schematic diagram of an apparatus for synchronously updating metadata in a distributed database according to an embodiment.

FIG. 8 is a schematic diagram of an apparatus 800 for synchronously updating metadata in a distributed database according to an embodiment. The distributed database includes a plurality of database nodes. A first node stores a first primary replica of a target replicated table, and a plurality of remaining second nodes store first backup replicas of the target replicated table. A full synchronization protocol is used between the first primary replica and the first backup replicas. The apparatus can be applied to the first node.

As shown in FIG. 8, the apparatus 800 includes a receiving unit 801 and an update unit 802. The receiving unit 801 is configured to receive an update request related to first metadata of a first data table in the distributed database. The update unit 802 is configured to write update information related to the first metadata into the first primary replica based on the update request, so that the update information is synchronized to the respective first backup replicas of the plurality of second nodes based on the full synchronization protocol, and the plurality of second nodes obtain update data of the first metadata based on the update information when using the first metadata.

In some embodiments, the update request includes the update data; and the update unit 802 can be further configured to write the update data into the first primary replica.

In some embodiments, the update unit 802 can include: a determining subunit (not shown in the figure), configured to determine a target update marker related to the first metadata; and an update subunit (not shown in the figure), configured to write the target update marker into the first primary replica.

In some embodiments, the determining subunit can be further configured to: obtain a target version number, where the target version number is a version number of the first metadata or metadata of the distributed database, and is generated in response to an update operation corresponding to the update data; and generate the target update marker based on the target version number.

In some embodiments, the determining subunit can be further configured to use the target version number as the target update marker.

In some embodiments, the determining subunit can be further configured to: hash or sign the target version number, and use an obtained hash value or signature as the target update marker.

In some embodiments, the determining subunit can be further configured to: obtain target metadata that includes the update data, where the target metadata is at least partial content of the first metadata obtained after the update data is added, or is at least partial content of metadata obtained after the update data is added to the distributed database; and generate the target update marker based on the target metadata.

In some embodiments, the determining subunit can be further configured to: hash or sign the target metadata, and use an obtained hash value or signature as the target update marker.

In some embodiments, the update request includes the update data; and the apparatus 800 can further include a storage unit (not shown in the figure), configured to correspondingly cache the update data and the target update marker into a local memory.

In some embodiments, the first node further stores a second primary replica of a metadata table, and the metadata table stores metadata of the distributed database; and the storage unit can be further configured to update the cached update data to the second primary replica.

In some embodiments, the receiving unit 801 can be further configured to: after the target update marker is synchronized to the respective first backup replicas of the plurality of second nodes, receive a request that is for obtaining the update data and that is sent by any second node in the plurality of second nodes, where the obtaining request is sent by the any second node when it is detected that the target update marker associated with the first metadata is not cached in a memory of the second node; and the apparatus 800 can further include a sending unit (not shown in the figure), configured to return the update data to the any second node.

In the apparatus embodiment corresponding to FIG. 8, for specific processing of units and technical effects brought by the units, refer to related descriptions in the above method embodiments. Details are not described herein again.

Figure 9:
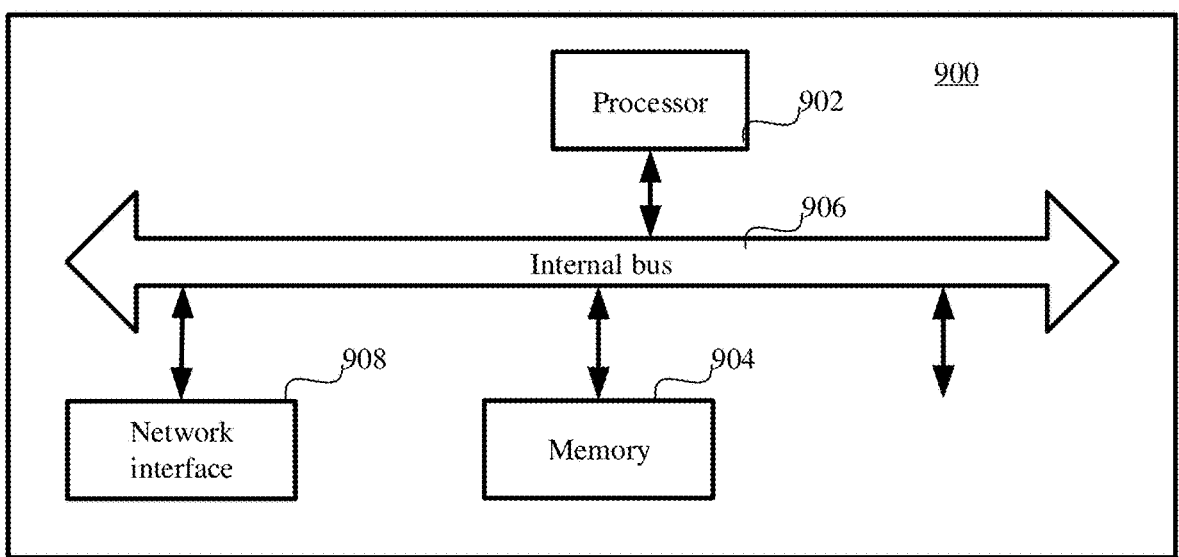
FIG. 9 is a schematic diagram of an apparatus for synchronously updating metadata in a distributed database according to an embodiment.

FIG. 9 is a schematic diagram of an apparatus 900 for synchronously updating metadata in the distributed database according to an embodiment. The apparatus 900 is applicable to any of the database nodes described above, and includes a processor 902, and a memory 904 storing instructions executable by the processor 902. The apparatus 900 may further include a network interface 908 connected with the processor 902 and the memory 904 via an internal bus 906. The processor 902 is configured to perform the above method for synchronously updating metadata in the distributed database.

An embodiment of this specification further provides a non-transitory computer-readable storage medium. The computer-readable storage medium stores a computer program, and when the computer program is executed by a processor of a computer, the computer is caused to perform the above method for synchronously updating metadata in a distributed database.

In the embodiments of this specification, the distributed database can include a plurality of database nodes, and the solution can support pre-establishment of a target replicated table in the distributed database. A first primary replica of the target replicated table can be stored on a first node in the plurality of database nodes, first backup replicas of the target replicated table can be stored on a plurality of remaining second nodes, and a full synchronization protocol is used between the first primary replica and the first backup replicas. Based on this, when a user modifies first metadata of any first data table in the distributed database, the first node can receive an update request related to the first metadata; and can write update information related to the first metadata into the first primary replica based on the update request, so that the update information is synchronized to the respective first backup replicas of the plurality of second nodes based on the full synchronization protocol, and the plurality of second nodes obtain update data of the first metadata based on the update information when using the first metadata. Therefore, by effectively using the target replicated table, metadata can be synchronously updated, and it can be ensured that after the user modifies the metadata, each database node can definitely read updated metadata.

A person skilled in the art should be aware that the functions described in the embodiments of this specification can be implemented by hardware, software, firmware, or any combination thereof. When being implemented by software, these functions can be stored in a computer-readable medium or transmitted as one or more instructions or code on a computer-readable medium.

In some cases, the actions or steps described in the claims can be performed in a sequence different from that in the embodiments and desired results can still be achieved. In addition, the process depicted in the accompanying drawings does not necessarily need a particular sequence or a consecutive sequence to achieve the desired results. In some implementations, multi-tasking and parallel processing are feasible or may be advantageous.

The objectives, technical solutions, and beneficial effects of the plurality of embodiments disclosed in this specification are further described above in detail. It should be understood that the above descriptions are merely example embodiments of this specification, but are not intended to limit the protection scope of this specification. Any modification, equivalent replacement, improvement, and the like made based on the technical solutions of the embodiments disclosed in this specification shall fall within the protection scope of this specification.

What is claimed is:

1. A method for synchronously updating metadata in a distributed database, wherein the distributed database comprises a plurality of database nodes, and the method comprises:

receiving, by a first database node of the plurality of database nodes, an update request related to first metadata of a first data table in the distributed database, wherein the first database node stores a first primary replica of a target replicated table, a plurality of remaining second database nodes store first backup replicas of the target replicated table, and a full synchronization protocol is used between the first primary replica and the first backup replicas; and writing, by the first database node, update information related to the first metadata into the first primary replica based on the update request, thereby to synchronize the update information to the respective first backup replicas of the plurality of second database nodes based on the full synchronization protocol, wherein synchronizing the update information comprises the first database node sending a redo log for the plurality of second database nodes to perform a same operation of writing the update information into the respective first backup replicas based on the redo log;

wherein when the first metadata is used by a second database node of the plurality of second database nodes, update data of the first metadata is obtained by the second database node based on the update information;

wherein the writing update information related to the first metadata into the first primary replica comprises determining a target update marker associated with the first metadata, and the determining the target update marker comprises:

obtaining a target version number, wherein the target version number is a version number of the first metadata or metadata of the distributed database, and is generated in response to an update operation corresponding to the update data; and generating the target update marker based on the target version number.

2. The method according to claim 1, wherein the update request comprises the update data; and the writing update information related to the first metadata into the first primary replica comprises:

writing the update data into the first primary replica.

3. The method according to claim 1, wherein the writing update information related to the first metadata into the first primary replica further comprises:

determining a target update marker related to the first metadata; and writing the target update marker into the first primary replica.

4. The method according to claim 3, wherein the update request comprises the update data; and the method further comprises:

correspondingly caching the update data and the target update marker into a local memory.

5. The method according to claim 4, wherein the first database node further stores a second primary replica of a metadata table, and the metadata table stores metadata of the distributed database; and the method further comprises:

updating the cached update data to the second primary replica.

6. The method according to claim 4, wherein after the target update marker is synchronized to the respective first backup replicas of the plurality of second database nodes, the method further comprises:

receiving an obtaining request for obtaining the update data, wherein the obtaining request is sent by the second database node of the plurality of second database nodes when it is detected that the target update marker associated with the first metadata is not cached in a memory of the second database node; and returning the update data to the second database node.

7. The method according to claim 1, wherein the generating the target update marker based on the target version number comprises:

using the target version number as the target update marker.

8. The method according to claim 1, wherein the generating the target update marker based on the target version number comprises:

hashing or signing the target version number, and using an obtained hash value or signature as the target update marker.

9. The method according to claim 1, wherein the determining the target update marker associated with the first metadata comprises:

obtaining target metadata that comprises the update data, wherein the target metadata is at least partial content of the first metadata obtained after the update data is added, or is at least partial content of metadata obtained after the update data is added to the distributed database; and generating the target update marker based on the target metadata.

10. The method according to claim 9, wherein the generating the target update marker based on the target metadata comprises:

hashing or signing the target metadata, and using an obtained hash value or signature as the target update marker.

11. A method for synchronously updating metadata in a distributed database, wherein the distributed database comprises a plurality of database nodes, and the method comprises:

receiving, by a first database node of the plurality of database nodes, an update request related to first metadata of a first data table in the distributed database, wherein the first database node stores a first primary replica of a target replicated table, a plurality of remaining second database nodes store first backup replicas of the target replicated table, and a full synchronization protocol is used between the first primary replica and the first backup replicas;

writing, by the first database node, update information related to the first metadata into the first primary replica based on the update request, to synchronize the update information to the respective first backup replicas of the plurality of second database nodes based on the full synchronization protocol, wherein synchronizing the update information comprises the first database node sending a redo log for the plurality of second database nodes to perform a same operation of writing the update information into the respective first backup replicas based on the redo log; and obtaining, by a second database node in the plurality of second database nodes when using the first metadata, update data of the first metadata based on the update information synchronized to a local first backup replica;

wherein the writing update information related to the first metadata into the first primary replica comprises determining a target update marker associated with the first metadata, and the determining the target update marker comprises:

obtaining a target version number, wherein the target version number is a version number of the first metadata or metadata of the distributed database, and is generated in response to an update operation corresponding to the update data; and generating the target update marker based on the target version number.

12. The method according to claim 11, wherein the update request comprises the update data;

the writing update information related to the first metadata into the first primary replica comprises:

writing the update data into the first primary replica; and the obtaining update data of the first metadata comprises:

obtaining the update data from the local first backup replica.

13. The method according to claim 11, wherein the writing update information related to the first metadata into the first primary replica further comprises:

determining a target update marker related to the first metadata; and writing the target update marker into the first primary replica.

14. The method according to claim 13, wherein the update request comprises the update data; and the method further comprises:

correspondingly caching, by the first database node, the update data and the target update marker into a local memory of the first database node.

15. The method according to claim 14, wherein the obtaining update data of the first metadata comprises:

reading the target update marker from the local first backup replica;

detecting whether the target update marker associated with the first metadata is cached in a local memory of the second database node;

sending a request for obtaining the update data to the first database node, in response to detecting that the target update marker associated with the first metadata is not cached in the local memory of the second database node; and receiving the update data returned by the first database node; and the method further comprises:

correspondingly caching, by the second database node, the update data and the target update marker into the local memory of the second database node.

16. The method according to claim 15, wherein a historical update marker associated with the first metadata is cached in the local memory of the second database node; and the detecting whether the target update marker associated with the first metadata is cached in a local memory of the second database node comprises:

determining whether the target update marker is the same as the historical update marker; and if it is determined that the target update marker is the same as the historical update marker, determining that the target update marker associated with the first metadata is cached in the local memory of the second database node; or if it is determined that the target update marker is not the same as the historical update marker, determining that the target update marker associated with the first metadata is not cached in the local memory of the second database node.

17. The method according to claim 15, after the correspondingly caching, by the second database node, the update data and the target update marker into the local memory of the second database node, further comprising:

reading the target update marker from the local first backup replica when using the first metadata again;

detecting whether the target update marker associated with the first metadata is cached in the local memory; and obtaining the update data from the local memory in response to detecting that the target update marker associated with the first metadata is cached in the local memory.

18. An apparatus for synchronously updating metadata in a distributed database, wherein the distributed database comprises a plurality of database nodes, and the apparatus comprises:

a processor; and a memory storing instructions executable by the processor, wherein the processor is configured to:

receive, by a first database node of the plurality of database nodes, an update request related to first metadata of a first data table in the distributed database, wherein the first database node stores a first primary replica of a target replicated table, a plurality of remaining second database nodes store first backup replicas of the target replicated table, and a full synchronization protocol is used between the first primary replica and the first backup replicas; and write, by the first database node, update information related to the first metadata into the first primary replica based on the update request, to synchronize the update information to the respective first backup replicas of the plurality of second database nodes based on the full synchronization protocol, wherein synchronizing the update information comprises the first database node sending a redo log for the plurality of second database nodes to perform a same operation of writing the update information into the respective first backup replicas based on the redo log;

wherein when the first metadata is used by a second database node of the plurality of second database nodes, update data of the first metadata is obtained by the second database node based on the update information;

wherein the writing update information related to the first metadata into the first primary replica comprises determining a target update marker associated with the first metadata, and the determining the target update marker comprises:

obtaining a target version number, wherein the target version number is a version number of the first metadata or metadata of the distributed database, and is generated in response to an update operation corresponding to the update data; and generating the target update marker based on the target version number.

* * * * *